United States Patent Office 3,538,418
Patented Nov. 3, 1970

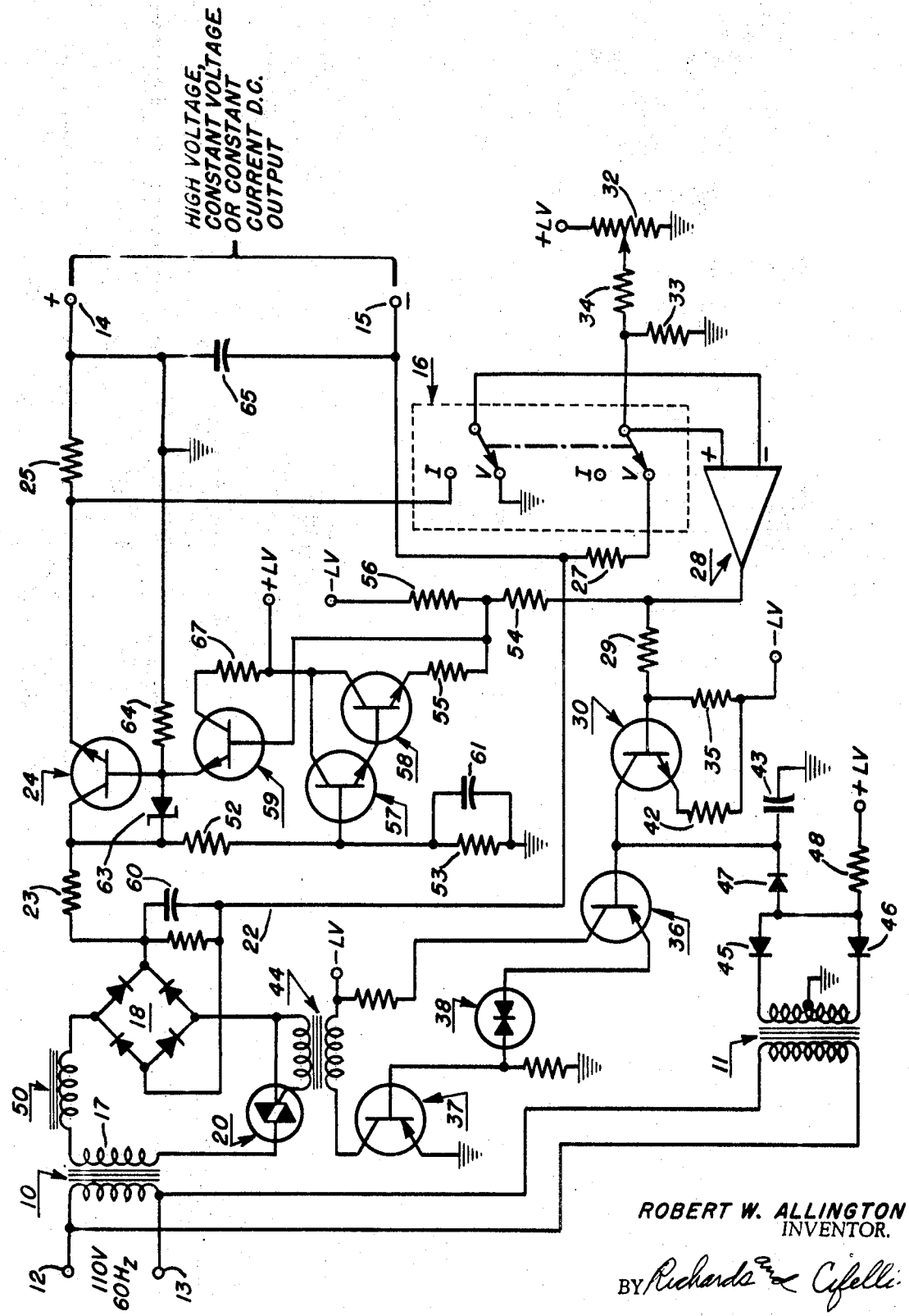

3,538,418
SWITCHING-MODE VOLTAGE AND CURRENT REGULATOR
Robert W. Allington, Lincoln, Nebr., assignor to Instrumentation Specialties Company, Lincoln, Nebr., a corporation of Nebraska
Filed Oct. 29, 1968, Ser. No. 771,514
Int. Cl. H02m 7/00
U.S. Cl. 321—18                                    12 Claims

ABSTRACT OF THE DISCLOSURE

An alternating current input to direct current output power supply incorporating a switching-mode preregulator and a postregulator for providing a constant voltage or a constant current output, said preregulator and postregulator being simultaneously controlled by means of negative feedback derived from the output circuitry. The postregulator, which may be a dynamic low-pass filter, may otherwise be controlled solely by negative feedback from the output circuitry, or with additional feedback from the switching-mode preregulator.

BACKGROUND OF THE INVENTION

The invention relates to voltage-current regulators of the switching-mode class, which regulators have the advantage of higher efficiency than series-pass or other similar regulators that use variable power-absorbing elements.

In my co-pending application Ser. No. 771,521 filed Oct. 29, 1968, and entitled Switching-Mode Voltage and Current Regulator, there is disclosed a regulated power supply providing a high voltage output and wherein the switching-mode preregulator is a bidirectional switching element operated at a relatively low voltage. The alternating current voltage output from the switching element and an associated power transformer is applied to a rectifying voltage multiplier and the voltage output of the multiplier is supplied to the output terminals of the power supply through a series-pass postregulator stage which is controlled by means of negative feedback derived from the output circuitry. In such arrangement, it is relatively difficult to add additional circuitry to prevent the circuit from sustaining damage or becoming unstable during output current overloads, since the feedback does not directly control the preregulator but, instead, controls the postregulator which in turn controls the preregulator.

In a power supply made in accordance with this invention, the control circuitry for the switching-mode preregulator is connected directly to the output of the amplifier providing the negative voltage feedback. It is most convenient to connect an output overload sensing circuit to the input of the amplifier, and the best results are obtained if the switching-mode preregulator is immediately turned down when a fault occurs.

SUMMARY OF THE INVENTION

A regulated power supply having a switching-mode preregulator connected between a rectifier and a source of alternating current voltage, the output voltage of said rectifier being applied to the output terminals of the power supply through a postregulator stage which functions as a dynamic low-pass filter. A direct current amplifier, coupled to the output circuitry, provides negative voltage feedback simultaneously to the preregulator and the postregulator stage. Manually-operable switch means are provided to condition the power supply for operation either at a constant voltage output or a constant current output, and the magnitude of the voltage across the output terminals of the power supply can be varied from zero to maximum by adjusting the magnitude of an offset potential applied to the input of the amplifier.

An object of this invention is the provision of an improved regulated power supply of the switching-mode class.

An object of this invention is the provision of a regulated power supply having a switching-mode preregulator stage and a postregulator stage simultaneously controlled by negative voltage feedback derived from the output circuitry.

An object of this invention is the provision of a regulated power supply having a switching-mode preregulator stage comprising a rectifier and a phase-controlled switching element connected to a source of alternating current voltage, a post-regulator stage connected between the rectifier and the output terminals of the power supply, negative feedback means coupled to the output circuitry of the power supply and simultaneously controlling the said preregulator and postregulator stages.

An object of this invention is the provision of a regulated power supply having a phase-controlled switching element controlling the magnitude of an alternating current voltage applied to a rectifier, a control circuit for said switching element, a dynamic low-pass filter interposed between the rectifier and the output terminals of the power supply, means for adjusting the magnitude of the voltage across the output terminals to a desired nominal value, means deriving a negative feedback voltage from the output circuitry of the power supply, and circuit elements applying the feedback voltage to the control circuit for the switching element.

The above-stated and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

BRIEF DESCRIPTION OF THE DRAWINGS

The single figure of the drawing is a circuit diagram of a switching-mode voltage and current regulator made in accordance with this invention.

DESCRIPTION OF THE PREFERRED EMBODIMENT

Referring now to the drawing, the primary windings of the transformers 10 and 11 are energized by a source of alternating current voltage connected to the input terminals 12 and 13 and the circuit functions to provide a regulated constant voltage or a constant current at the output terminals 14 and 15. A double-pole, double-throw switch 16 is positionable in one or the other position to condition the circuit for either constant voltage or constant current operation. It is here pointed out that the terminals having associated therewith the legends +LV and —LV are connected to a conventional constant voltage source of some convenient potential such as 15 volts, a potential of +15 volts above zero or ground potential appearing at the terminals marked +LV and a potential of —15 volts below ground or neutral appearing at the terminals marked —LV. The secondary winding 17, of the power transformer 10, is connected to a rectifier 18 through a phase-controlled bidirectional thyristor 20. One output junction of the rectifier is connected directly to the output terminal 15 by the lead 22, whereas the other output junction is connected to the output terminal 14 through the resistor 23, transistor 24 and resistor 25. The transistor 24 is used as a control element of a postregulator stage to improve the stability of the output and to decrease the alternating current component of the direct current output, as will be described hereinbelow.

When the switch 16 is set to the illustrated V position, the power supply provides a regulated constant voltage direct current output, whereas when the switch is set to the I position, the power supply functions to provide a constant current direct current output. For constant voltage operation, regulation is obtained by negative voltage feedback through the coupling resistor 27, direct current amplifier 28 and the voltage dropping resistor 29 connected to the base of the transistor 30, said transistor being part of the control circuitry for the switching-mode preregulator comprising the thyristor 20 and the rectifier 18. The output voltage may be adjusted from zero to maximum by introducing an offset voltage to the amplifier 28 by means of the potentiometer 32 and a voltage divider comprising the resistors 33 and 34. For constant current operation, negative current feed-back is supplied by means of the voltage appearing across the current-sensing resistor 25, which voltage is amplified and coupled to the switching-mode preregulator by the voltage dropping resistor 29.

The switching-mode preregulator performs its function of supplying a regulated output as follows. The output voltage of the amplifier 28 is applied in a negative feedback manner, through the voltage divider resistors 29 and 35, to provide phase-control of the bidirectional thyristor 20 through a control circuit comprising the transistors 30, 36 and 37 and the four-layer diode 38. If the output voltage or output current of the power supply drops below the desired value an amplified voltage, related to this change, is applied through the voltage dividing resistor 29 to the base of the transistor 30. The resulting rise in the potential on the base of the transistor 30 causes this transistor to conduct more heavily, whereby increased current flowing through the transistor and the resistor 42 results in a more rapid charge of the capacitor 43. Approximately the same potential will appear on the emitter of the transistor 36, by emitter follower action. When this potential rises above the breakdown potential of the four-layer diode 38, the diode will suddenly permit a pulse of current to flow which will turn on the transistor 37. This causes current to flow through the primary winding of the pulse transformer 44. The resulting potential developed in the secondary winding, of the pulse transformer, causes the thyristor 20 to suddenly turn on, and the thyristor will remain in the turned-on state until the end of the alternating current half cycle of the voltage developed in the secondary winding of the power transformer 10. The effective alternating current input voltage applied to the rectifier 18 depends upon the conduction angle of the phase-controlled bidirectional thyristor 20. The lower the output current or voltage is from the desired value, the faster will the capacitor 43 charge and the sooner will be thyristor conduct. This increases the effective average alternating current voltage which is supplied to the rectifier 18 supplying power to the output circuitry through the postregulator stage, the operation of which will be described hereinbelow. This controls the effective output voltage or current so it will remain substantially constant in spite of any disturbances.

The diodes 45, 46, 47 and the resistor 48 comprise a resetting circuit to reset the charge and the integrated potential on the capacitor 43 to zero at the end of each alternating current half cycle. The diodes 45 and 46 conduct and provide a reverse bias on the diode 47 during most of each alternating current half cycle. When the potential of the secondary of the transformer 11 drops to zero, as it does at the end of every alternating current half cycle, the diodes 45 and 46 stop conducting and the charge on the capacitor 43 is very rapidly dissipated by means of current flow through the diode 47 and the resistor 48.

The inductor 50, connected between the secondary of the power transformer 10 and the rectifier 18, limits the maximum current flow through the rectifier at the instant that the thyristor 20 begins to conduct. This improves the efficiency and stability of the circuit. The inductor 50 may be a separate inductor or may be incorporated in the leakage inductance of the transformer 10. Under certain conditions the rough-filtering capacitor 60 may be omitted if the inductor 50 is connected in the output circuit of the rectifier 18 instead of in the input circuit as shown.

The postregulator stage can be connected in several ways. As shown in the drawing, the transistor 24 and the associated circuitry forms essentially a dynamic low-pass filter. The average collector to emitter potential of this transistor is set by the voltage dividing resistors 52, 53, the voltage dividing resistors 54, 55 and the bias-setting resistor 56. The voltage dividing resistors 52–55 provide negative feedback which is used to maintain the voltage from the collector to the emitter constant regardless of changes in the loading of the circuit. The resistor 52 is connected between the collector of the transistor 24, and the output of the voltage divider 52, 53 is led to current amplifying transistors 57 and 58. An amplified current from the emitter of the transistor 58 is led through the voltage divider 54, 55 to the base of the current amplifying transistor 59 having its emitter connected to the base of the transistor 24 and, therefore, controlling the current passing through the transistor 24. This negative feedback arrangement stabilizes the collector to emitter potential of the transistor 24. The value of the bias-setting resistor 56 is selected to provide the desired average direct current potential between the emitter and collector of the transistor 24. A capacitor 61 forms a low-pass filter in conjunction with the voltage dividing resistor 52 and 53, thereby preventing alternating current fluctuations on the collector of the transistor 24 from causing corresponindg fluctuations in the current flowing from the collector to emitter and thence through the resistor 25 and into the output circuit. It will now be apparent that the transistors 24, 57, 58 and 59, the resistors 52–55 and the capacitor 61 form a dynamic low-pass filter which functions to prevent alternating current fluctuations due to ripple in the output of the rectifier 18 from appearing at the output terminals 14 and 15.

The voltage-dividing resistor 54 preferably is connected to the output of the amplifier 28, instead of to ground or some other point of constant potential. This is advantageous because it provides a negative feedback from the output circuit to the dynamic low-pass filter, thereby resulting in increasing the speed of response of regulation to disturbances in the output circuit, a decrease in the amount of ripple and noise in the output circuitry, and an improvement in the overall stability of the regulator. The resistor 67 limits the maximum current which can flow through the transistor 24. A Zener diode 63 conducts if the collector to base potential of the transistor 24 should reach dangerously high voltages and helps prevent damage to this transistor during accidental short-circuiting of the output terminals. The resistor 23 limits the current flow through the transistor 24 during such fault conditions, and the resistor 64 improves the temperature stability of this transistor. A capacitor 65, connected across the output terminals, improves the overall stability of the circuit and tends to absorb voltage spikes at the time the bi-directional thyristor 20 conducts.

It is here pointed out that the postregulator will still function if the capacitor 61 is removed, provided the resistor 54 is connected to the amplifier as shown. In such case, the negative feedback through the amplifier alone will suppress output ripple originating from the rectifier 18 and the negative feedback from the voltage dividers 52, 53 and 54 and 55 will set the average collector to emitter potential of the postregulator transistor 24. These voltage dividers can be omitted altogether if the postregulator element has an appreciably rising slope to its voltage-current characteristic, as it will then tend to be self-regulating. In such case, the postregulator would be controlled solely by negative feedback from the output circuitry through the resistor 54 so that the resistors 55, 52 and 53, together with the transistors 57 and 58, would then be omitted.

The drawing illustrates a simplified circuit diagram and it will be apparent to those skilled in this art that additional means can be added to the circuit to increase the operating range, and to improve regulation, stability and ability to withstand overloads. The rectifier 18 can be replaced by a rectifying voltage multiplier, thereby to provide a high output voltage even though the switching element is operated at relatively low voltage. The rectifier 18 can use switching devices such as controlled rectifiers, thereby combining the functions of regulation and rectification and eliminating the separate bidirectional thyristor 20.

Having now described the invention those skilled in this art will be able to make various changes and modifications without thereby departing from the spirit and scope of the invention.

I claim:

1. In a regulated alternating current input to direct current output power supply of the switching-mode class, the improvement wherein the switching function is performed by a phase-controlled switching element providing a phase-controlled voltage which is applied to the output circuit of the power supply through rectifying means; wherein a postregulator stage is incorporated between the rectifying means and the output circuit, wherein the phase-control for said switching element is derived by negative feedback means from the output circuit and wherein the postregulator stage also is controlled by negative feedback means from the output circuit.

2. In a regulated alternating current input to direct current output power supply of the switching-mode class, the improvement wherein the switching function is performed by a phase-controlled switching element providing a phase-controlled voltage which is applied to the output circuit of the power supply through rectifying means; wherein a postregulator stage is incorporated between the rectifying means and the output circuit, wherein the phase-control for said switching element is derived by negative feedback means from the output circuit, and wherein said postregulator stage functions substantially as a dynamic low-pass filter.

3. The improvement as recited in claim 2, wherein the postregulator stage is also partially controlled by negative feedback means from the output circuit.

4. A regulated alternating current input to direct current output power supply comprising:
 (a) a preregulator stage comprising a combination phase-controlled switching element and rectifier connected to a source of alternating current voltage,
 (b) a postregulator stage connected between said rectifier and the output circuitry of the power supply, said postregulator stage functioning substantially as a dynamic low-pass filter, and
 (c) means controlling the said switching element by negative feedback from said output circuitry.

5. The invention as recited in claim 4, wherein the post-regulator stage functions substantially as a dynamic low-pass filter and is also partially controlled by negative feedback from the output circuitry.

6. A regulated alternating current input to direct current output power supply comprising:
 (a) a preregulator stage comprising a combination phase-controlled switching element and rectifier connected to a source of alternating current voltage,
 (b) a postregulator stage connected between said rectifier and the output circuitry of the power supply,
 (c) means controlling the said switching element by negative feedback from said output circuitry, and
 (d) means controlling the postregulator stage by negative feedback from said output circuitry.

7. The invention as recited in claim 6, including means at least partially controlling the postregulator stage by negative feedback derived from the point of connection between the preregulator and postregulator stages.

8. A regulated power supply comprising:
 (a) a power transformer connectable to a source of alternating current voltage,
 (b) a preregulator stage comprising a rectifier connected to the secondary winding of said transformer through a phase-controlled bi-directional thyristor,
 (c) a postregulator stage connected between the rectifier and the output circuit of the power supply,
 (d) means for adjusting the output voltage of the power supply to a predetermined value,
 (e) a phase-control circuit for said thyristor,
 (f) means including an amplifier developing a feedback voltage derived from said output circuit,
 (g) circuit elements applying said feedback voltage to said phase-control circuit, and
 (h) circuit elements applying said feedback voltage to the postregulator stage.

9. The invention as recited in claim 8, wherein the postregulator stage is also controlled by a negative feedback voltage derived at the point of connection between the preregulator and postregulator stages.

10. The invention as recited in claim 8, wherein the said phase-control circuit comprises a first transistor having a base connected to the output circuit of the amplifier and an emitter connected to the negative side of a constant voltage source; a second transistor having a base connected to the collector of said first transistor and a collector connected to the negative side of the constant voltage source; a third transistor; a second transformer having a primary winding connected between the collector of said third transistor and the negative side of the constant voltage source, said transformer having a secondary winding connected to the gate electrode of the said thyristor; a four-layer diode connected between the emitter of said second transistor and the base of said third transistor; and a capacitor having one side connected to the base of said second transistor and the other side connected to the emitter of said third transistor.

11. The invention as recited in claim 10, including a resetting circuit for discharging said capacitor at the end of every half-cycle of the voltage applied to said power transformer, said resetting circuit comprising a third transformer having a primary winding connected to the primary winding of said power transformer, said third transformer having a secondary winding with a center tap connected to the said other side of said capacitor; a pair of diodes connected in the same sense across the secondary winding of the third transformer; a resistor connected between the said pair of diodes and the positive side of the constant voltage source; and a third diode connected between the said one side of said capacitor and said resistor, said third diode being arranged in a sense opposite to that of said pair of diodes.

12. A regulated power supply comprising:
 (a) a power transformer connectable to a source of alternating current voltage,
 (b) a preregulator stage comprising a rectifier connected to the secondary winding of said transformer through a phase-controlled bi-directional thyristor,
 (c) a post regulator stage connected between the rectifier and the output circuit of the power supply said postregulator stage comprising a plurality of transistors and associated components connected to function substantially as a dynamic low-pass filter,
 (d) means for adjusting the output voltage of the power supply to a predetermined value,
 (e) a phase-control circuit for said thyristor,
 (f) means including an amplifier developing a negative feedback voltage derived from said output circuit, and (g) circuit elements applying said feedback voltage to said phase-control circuit.

References Cited

UNITED STATES PATENTS

| | | | |
|---|---|---|---|
| 3,114,873 | 12/1963 | Love | 321—18 XR |
| 3,213,351 | 10/1965 | Walker | 321—18 |
| 3,289,069 | 11/1966 | Todd | 321—18 |
| 3,356,927 | 12/1967 | Barron | 321—18 |
| 3,372,326 | 3/1968 | Stefanov | 321—18 XR |
| 3,375,428 | 3/1968 | Mitchell. | |

WILLIAM M. SHOOP, JR., Primary Examiner

U.S. Cl. X.R.

323—22, 24